(12) United States Patent
Geib et al.

(10) Patent No.: US 6,565,689 B2
(45) Date of Patent: *May 20, 2003

(54) NON-SLIP CONVEYOR AND METHOD FOR PRODUCING SAME

(75) Inventors: Randall R. Geib, Manheim, PA (US); Grant Q. Moyer, Myerstown, PA (US)

(73) Assignee: Fenner, Inc., Manheim, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,454

(22) Filed: May 27, 1998

(65) Prior Publication Data
US 2002/0066514 A1 Jun. 6, 2002

(51) Int. Cl.$^7$ ............................................... B65G 15/34
(52) U.S. Cl. ..................... 156/137; 156/266; 156/324; 264/112; 198/850; 198/853
(58) Field of Search .................. 156/62.2, 137, 156/324, 266; 264/112, 113; 198/850, 853; 474/241

(56) References Cited

U.S. PATENT DOCUMENTS

| 72,181 A | 12/1867 | Fountain |
| 1,177,664 A | 4/1916 | Vuilleumier |
| 1,182,933 A | 5/1916 | Schulte |
| 1,438,566 A | 12/1922 | Wiggins |
| 1,519,165 A | 12/1924 | Pilliner |
| 2,969,686 A | * 1/1961 | Runton |
| 3,154,961 A | 11/1964 | Creswell |
| 3,991,632 A | 11/1976 | Stephens |
| 4,028,956 A | 6/1977 | Thompson |
| 4,055,265 A | 10/1977 | Eisenman |
| 4,342,809 A | * 8/1982 | Newell ..................... 242/352.4 |
| 4,377,365 A | 3/1983 | Layh |
| 4,526,637 A | * 7/1985 | Long .......................... 156/137 |
| 4,994,133 A | * 2/1991 | Oizumi et al. .............. 156/270 |
| 5,011,003 A | 4/1991 | Gladding |
| 5,048,809 A | * 9/1991 | Tebbe et al. ................... 118/32 |
| 5,267,596 A | * 12/1993 | Logar et al. ................. 152/179 |
| 5,281,189 A | * 1/1994 | Agnoff ........................ 474/190 |
| 5,507,383 A | * 4/1996 | Lapyere et al. ............. 198/853 |
| 5,564,558 A | * 10/1996 | Hampton et al. ........... 198/850 |
| 6,062,379 A | * 5/2000 | Geib et al. ................ 199/844.1 |

\* cited by examiner

*Primary Examiner*—Sam Chuan Yao
(74) *Attorney, Agent, or Firm*—Stephen H. Eland; Dann, Dorfman, Herrell and Skillman

(57) ABSTRACT

A method for producing the conveyor assembly is also provided. A plurality of layers of reinforcing material are arranged in overlapping relation. A binding material such as thermoset urethane is deposited on the reinforcing material to bind the reinforcing materials together, thereby forming a composite material. A gripping material is deposited on the composite material, forming a gripping layer. The combined gripping layer and composite material are cured so that the gripping layer permanently bonds to the composite material. The combined gripping layer and composite material are then cut into a plurality of belt links, such that the gripping layer of each belt link is coextensive with the upper surface of the belt link. The belt links are then assembled to produce a link belt having a gripping surface formed from the gripping layers of the individual belt links.

19 Claims, 3 Drawing Sheets

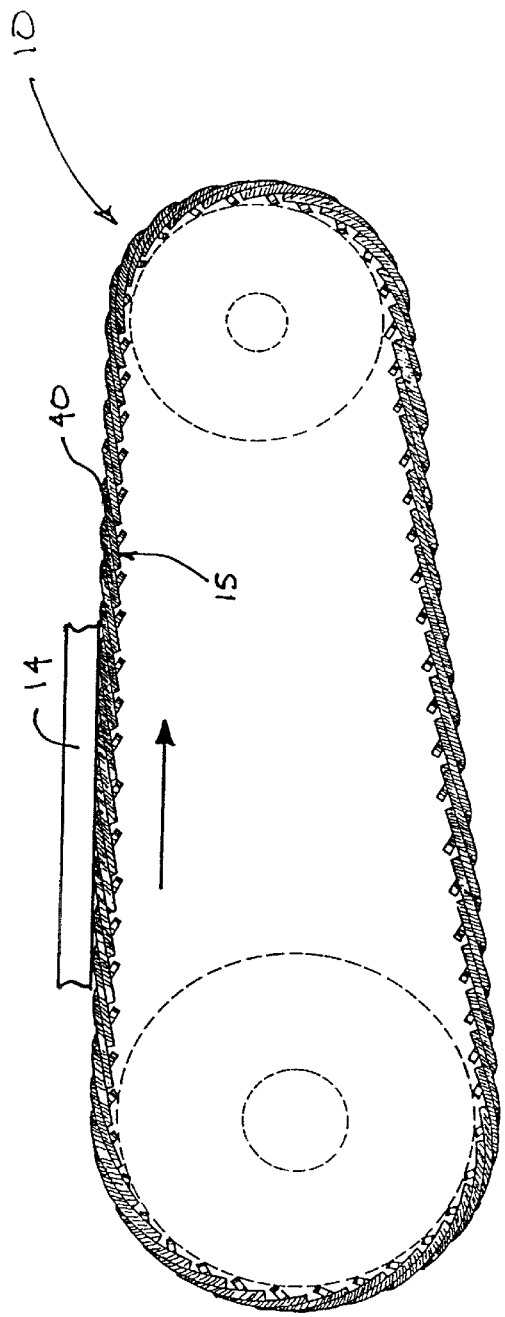
FIG. 1
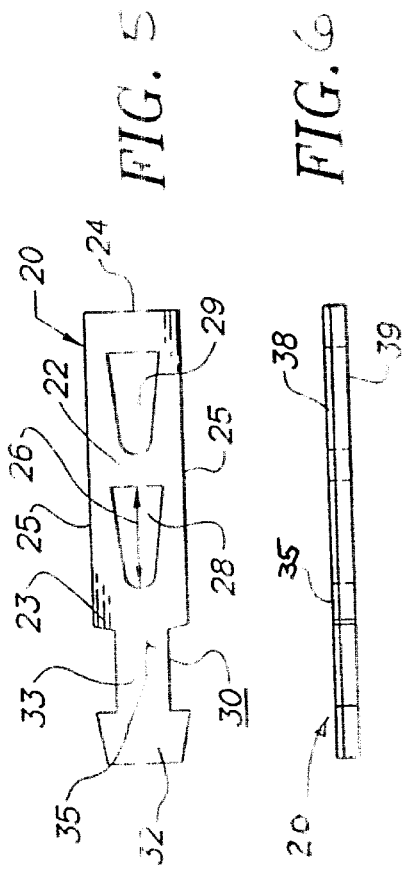
FIG. 5
FIG. 6

NON-SLIP CONVEYOR AND METHOD FOR PRODUCING SAME

FIELD OF THE INVENTION

The present invention relates to interlocking-link conveyor belts and has particular use in applications in which the conveyor is used to convey a workpiece and an increased gripping force between the conveyor and the workpiece is desired to reduce slippage between the conveyor and the workpiece.

BACKGROUND OF THE INVENTION AND DISCUSSION OF PRIOR ART

Link belts are generally known and used in a variety of applications, such as transmission belts and conveyor belts. When used as a conveyor, there may be slippage between the conveyor and the workpiece being conveyed. In some applications, it is desirable to reduce the slippage between the conveyor and the workpiece.

SUMMARY OF THE INVENTION

A conveyor assembly that incorporates a link belt having a high friction upper surface is provided, along with a method for producing the same. The link belt is comprised of a series of belt links arranged in superimposed successive overlapping relation. The belt has a thickness between its top and bottom sides corresponding to the thickness of at least two belt links.

Each belt link has a body portion having at least one aperture and an integral fastener at the leading end of the body portion. The fastener includes a laterally constricted fastener neck portion and a fastening tab connected to the body portion through the neck portion.

The belt links are secured together in overlapping relation to form a belt by the neck of the fastener extending from one of the sides of the belt through the aperture in the preceding belt link. The fastening tab engages the other side of the belt at the preceding belt link to secure the belt links together.

The belt further includes a gripping surface on the top side of the belt. The gripping surface has a coefficient of friction that is higher than the coefficient of friction of the bottom side of the belt, and is operable to engage materials placed on the top side of the conveyor assembly.

The present invention also provides a method for producing a conveyor belt. In accordance with the method, a plurality of layers of reinforcing material are arranged in overlapping relation. A binding material is deposited on the reinforcing material to provide a composite material having an upper surface and a lower surface such that the reinforcing material is embedded within the composite material. A gripping material having a higher coefficient of friction than the binding material is selected. The gripping material is deposited on the upper surface of the composite material to form a layer of gripping material. The combined gripping layer and composite material are then cured so that the gripping layer bonds to the composite material. The combined gripping layer and composite material are cut to produce a plurality of belt segments.

A continuous belt is then formed from at least one belt segment so that the belt has a gripping surface and an opposite surface. The gripping surface is formed from the gripping layer of at least one belt segment. In addition, the gripping surface has a coefficient of friction that is greater than the coefficient of friction of the opposite surface.

BRIEF DESCRIPTION OF THE DRAWINGS

FIG. 1 is a side view of an interlocking-link conveyor assembly having a non-slip surface shown transporting a workpiece and engaged by a driving mechanism for the assembly.

FIG. 5 is a top view of an individual link of the belt shown in FIG. 1 prior to assembly.

FIG. 6 is a side view of the individual belt link shown in FIG. 5.

DETAILED DESCRIPTION OF THE PREFERRED EMBODIMENTS

Figure 2:
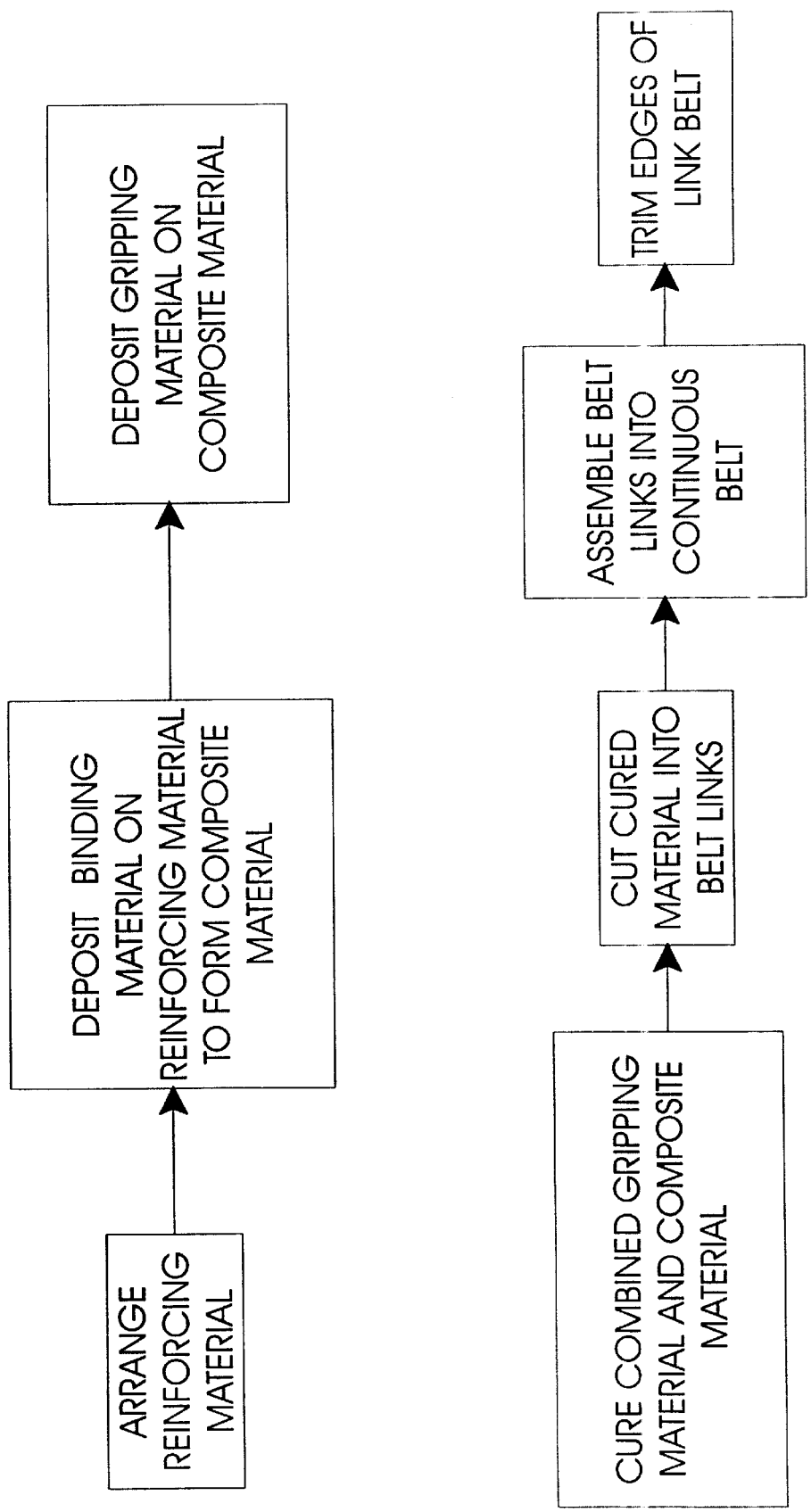
FIG. 2 is a block diagram illustrating the steps in the method for producing the conveyor assembly illustrated in FIG. 1.

Referring now to the drawings in general and FIG. 1 specifically, the preferred embodiment of a conveyor assembly comprising an interlocking-link belt 15 having a non-slip gripping surface 40 is designated generally 10. The assembly 10 is shown transporting a workpiece 14. When the work piece is placed on the conveyor assembly 10, the gripping surface engages the workpiece. The gripping surface 40 has a high coefficient of friction to prevent slippage between the workpiece and the conveyor assembly 10.

Figure 3:
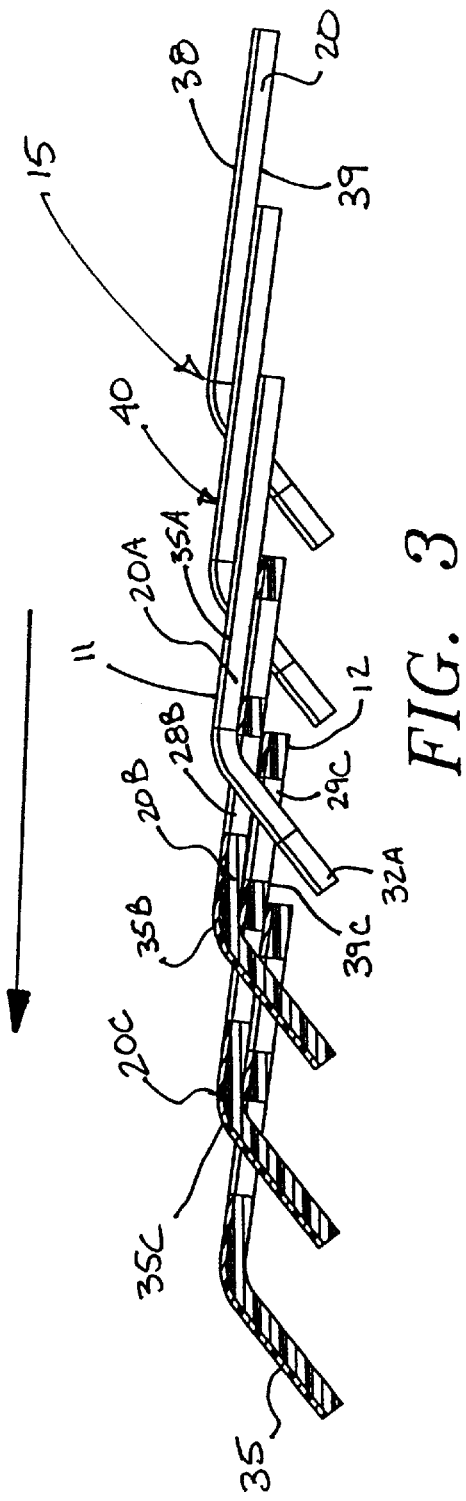
FIG. 3 is a fragmentary side view partially in section, of the belt shown in FIG. 1.
Figure 4:
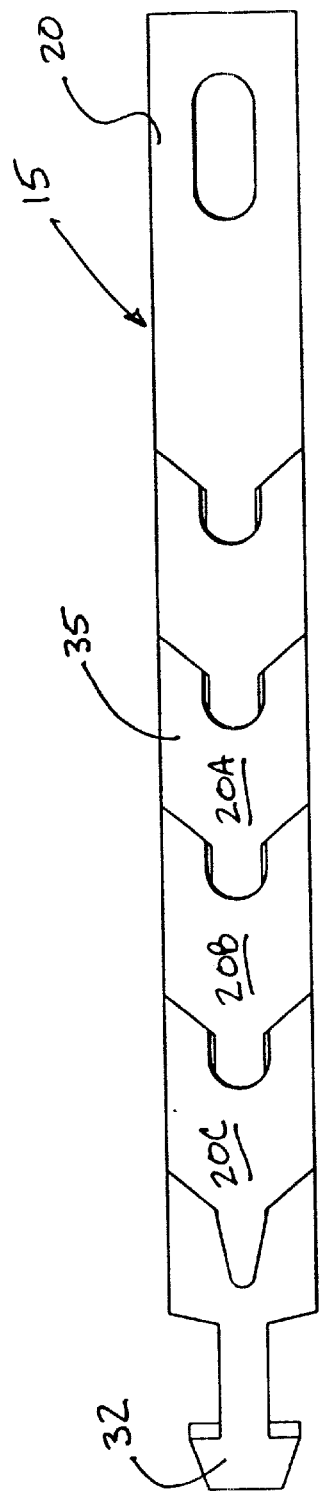
FIG. 4 is a plan view of the belt shown in FIG. 3.

Referring now to FIGS. 3 and 4, the belt 15 comprises a series of interlocking belt links 20. One of the individual links 20 that comprise belt 15 is illustrated in FIGS. 5 and 6. Each belt link 20 has a body portion 22 and a fastener 30 connected to the body portion. In the present instance, the thickness of the belt link 20 between the top surface 38 and the bottom surface 39 is substantially uniform throughout the entire link.

A high friction material is permanently bonded to the top surface of each belt link 20. The high friction material forms a gripping layer 35 that is coextensive with the top surface of the belt link 20. Preferably, the gripping layer 35 is approximately 1 mm.

When the belt links are assembled to form a belt 15, the gripping layer 35 of the belt links form the gripping surface 40 that engages the work piece 14 being transported by the conveyor belt assembly 10. Preferably, the gripping layer 35 is formed of a thermoplastic urethane and has a coefficient of friction that is greater than 1. In addition, the gripping layer 35 has a coefficient of friction that is higher than the coefficient of friction of the bottom surface 39 of the belt link 20.

The body portion 22 of the belt link 20 is generally rectangular, having two edges 25 extending longitudinally between a leading end 23 and a trailing end 24, both of which extend transversely between the two edges. Adjacent leading end 23 a leading aperture 28 extends through the thickness of body portion 22. Longitudinally spaced from the leading aperture 28 adjacent the trailing end 24, a trailing aperture 29 extends through the thickness of body portion 22.

The leading end 23 corresponds to the direction in which the assembly 10 travels as shown by the arrow in FIG. 1. However, the direction in which the assembly 10 travels can be reversed so that the leading end 23 does not lead the trailing end 24 with respect to the actual travel of the assembly.

The fastener 30 integrally connects the body portion 22, and comprises a fastening tab 32 and a constricted neck 33. The neck extends longitudinally, with one end connected to the fastening tab 32, and the other end connected to the leading end 23 of body 22. The length of the neck 33 between the leading end 23 and the fastening tab 32 is sufficiently long to allow the fastening tab 32 to extend through the apertures in two belt links 20 as will be further discussed below.

The fastening tab 32 is generally trapezoidal shaped, having two parallel ends that are transverse the neck 33. The fastening tab 32 is substantially wider than the neck 33, being widest at the point where it intersects the neck, and tapering as it extends away from the neck.

The belt links 20 are connected by passing the link fasteners through the apertures in adjacent belt links. To ensure that the belt links can properly connect, the apertures are configured and dimensioned with reference to the fastening tab and the neck.

In the present instance, the apertures through body 22 are non-circular. Both apertures 28 and 29 are longitudinally elongated so that their length 26 is greater than their width. To ensure that fastening tab 32 can pass through the apertures, the length of the apertures 26 is greater than the greatest width of the fastening tab 32.

The width of apertures 28 and 29 is not constant. Instead, the apertures widen as they extend toward trailing end 24. To provide proper connection between the belt links 20, the apertures are narrower than the fastening tab width so that the fastening tab 32 cannot pass back through the apertures once the belt links are connected. However, the apertures are wider than the neck 33 to allow the neck to extend through the apertures while the belt links are connected, as will be discussed below.

The belt links 20 are made of a material of sufficient tensile strength to convey the weight of the workpiece 14. In the preferred embodiment, the belt links 20 are made of a thermoset urethane that is reinforced with a polyester fabric.

Because the belt links have sufficient tensile strength to convey the weight of the workpiece 14, the material used to make the gripping layer 35 can be chosen according to its non-slip characteristics without significant regard to its tensile strength. A variety of resilient elastomeric materials can be used. In the preferred embodiments, the gripping layer is made from a thermoplastic urethane.

As previously stated, the assembly 10 comprises an interlocking-link belt 15 having a gripping surface 40, which is comprised of a plurality of belt links 20 that have been described above. The following discussion describes the interconnections between the belt links 20 that form the belt 15.

As shown in FIGS. 3 and 4, a series of belt links 20 are arranged in a superimposed successive overlapping relation to form the belt 15 with a gripping surface 40. The bottom surface 39 of each belt link overlaps the top surface 38 of an adjoining belt link, so that the thickness of the belt 15 is at least twice the thickness of an individual belt link 20.

FIG. 3 illustrates a portion of the assembly 10, showing how the gripping layers 35 of the belt links combine to form the gripping surface 40 when the belt links are interconnected. Included in these views is the connection between a belt link 20A, and the two preceding belt links, 20B, and 20C. In this connection, the fastening tab 32A of belt link 20A passes sideways through apertures in the two preceding belt links. It first passes through the leading aperture 28B of the adjacent preceding belt link 20B and then passes through the trailing aperture 29C of the next preceding belt link 20C.

The term preceding is used with respect to the direction the assembly travels, as shown in by the arrow in FIG. 3. Because the direction of travel can be reversed, the preceding belt links can be succeeding with respect to the actual travel of the assembly 10.

After passing through the aperture in belt link 20C, the belt link fastening tab 32A is twisted to bear against the bottom surface 39C of belt link 20C. When connected in this way, the top surface of belt link 20A is the top side 11 of belt 15, and the bottom surface 39C of belt link 20C is the bottom side 12 of belt 15.

Referring to FIG. 2, the belt 15 is produced as follows. The belt links 20 that make up the belt 15 include at least one layer of reinforcing material, such as woven polyester sheet. The reinforcing material is impregnated with a binding material to form a composite material. The binding material is liquified and deposited onto the reinforcing material while liquid. Preferably, the composite material includes a plurality of layers of reinforcing material and the binding material is a thermoset urethane.

A gripping material is deposited on the composite material, preferably while the binding material is wet. In other words, preferably the gripping material is deposited on the composite material before the composite material is cured or dried. The gripping material may be sprayed on, poured on or the composite material may be partially submerged in a bath of gripping material. However, preferably the gripping material is a film of thermoplastic urethane that is approximately coextensive with the upper surface of the composite material. Since the binding material of the composite material is wet when the film is placed on the composite material, the film adheres to the composite material.

After the gripping material is deposited on the composite material, the combination is cured. During the curing process the layer of gripping material permanently bonds to the composite material.

Ordinarily the cured material is at least several times wider that the width of the belt links 20. The cured material is therefore cut into a plurality of elongated strips approximately as wide as the width of a belt link 20. The belt links are then cut-out from the strips of cured material. In the present instance, the belt links are formed by punching, which also simultaneously punches the rearward and forward apertures in the belt links.

Formed in this way, the belt links 20 have an integral gripping layer approximately 1 mm thick forming the top surface 38 of the belt link. The gripping layer is coextensive with the substrate material forming the belt link 20 which in the present instance is polyester reinforced thermoset urethane.

The belt links 20 are assembled to form a continuous interlocking link belt 15. The belt links 15 are connected to one another as detailed above and shown in FIGS. 3 and 4. Preferably, the assembled belt is then trimmed by cutting the edges of the belt to form beveled edges that engage the sheaves of the pulleys about which the conveyor assembly 10 travels.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed. For instance, the process can be employed to form a single-piece belt rather than a link belt.

After the cured material is cut into strips, the two ends of a strip can be joined to form a belt. The joint can take the form of any of a number of known joints, such as a splice joint that is mechanically fastened or bonded with an adhesive. The edges of the assembled belt are then trimmed.

That which is claimed is:

1. A method for producing a conveyor belt for conveying a work piece, comprising the steps of:
   a. Providing a plurality of overlapping layers of reinforcing material;
   b. Depositing a binding material on the reinforcing material to produce a composite material having an upper surface and a lower surface such that the reinforcing material is embedded within the composite material;
   c. Selecting a gripping material having a higher coefficient of friction than the binding material;
   d. Depositing the gripping material on the upper surface of the composite material before drying the composite material;
   e. Curing the combined gripping layer and composite material so that the gripping layer bonds to the composite material;
   f. Cutting the combined gripping layer and composite material to produce a plurality of belt links, wherein each belt link has an integral fastener and the gripping layer is coextensive with the upper surface of the belt link; and
   g. Assembling the belt links to form a belt by connecting adjacent belt links in superimposed successive overlapping relation with the integral fasteners connecting adjacent links, so that the belt has a gripping service and an opposite surface, the gripping surface engaging the work piece as the work piece is transported by the conveyor belt, and the gripping surface being formed from the gripping layers of the belt links, so that the gripping surface has a coefficient of friction that is greater than the coefficient of friction of the opposite surface.

2. The method of claim 1 wherein the gripping material is selected so that the gripping material has a coefficient of friction above 1.0.

3. The method of claim 1 wherein the reinforcing material comprises woven polyester sheets.

4. The method of claim 1 wherein the binding material is a thermoset urethane.

5. The method of claim 4 wherein the gripping material is a thermoplastic urethane.

6. A method for producing a conveyor belt for conveying a work piece, comprising the steps of:
   a. Providing a plurality of overlapping layers of reinforcing material;
   b. Depositing a binding material on the reinforcing material to produce a composite material having an upper surface and a lower surface such that the reinforcing material is embedded within the composite material;
   c. Selecting a gripping material having a higher coefficient of friction than the binding material;
   d. Depositing the gripping material on the upper surface of the composite material before drying the composite material;
   e. Curing the combined gripping layer and composite material so that the gripping layer bonds to the composite material;
   f. Cutting the combined gripping layer and composite material to produce a plurality of belt segments; and
   g. Forming a continuous belt from at least one belt segment, so that the belt has a gripping surface and an opposite surface, the gripping surface being formed from the gripping layer of the at least one belt segment, wherein the gripping surface has a coefficient of friction that is greater than the coefficient of friction of the opposite surface.

7. The method of claim 6 wherein the gripping material is selected so that the gripping material has a coefficient of friction above 1.0.

8. The method of claim 6 wherein the binding material is a thermoset urethane.

9. The method of claim 8 wherein the gripping material is a thermoplastic urethane.

10. The method of claim 6 wherein each belt segment includes an integral fastener, and the belt forming step includes the step of connecting a plurality of belt links in superimposed successive overlapping relation with the integral fasteners connecting adjacent links.

11. The method of claim 6 wherein the gripping material is deposited on the composite material so that the gripping layer is coextensive with the upper surface of the composite material forming the belt segments.

12. A method for producing a belt link used to form a continuous interlocking link belt, comprising the steps of:
   a. Providing a plurality of overlapping layers of reinforcing material;
   b. Depositing a binding material on the reinforcing material to produce a composite material having an upper surface and a lower surface such that the reinforcing material is embedded within the composite material;
   c. Selecting a gripping material having a higher coefficient of friction than the binding material;
   d. Depositing the gripping material on the upper surface of the composite material before drying the composite material;
   e. Curing the combined gripping layer and composite material so that the gripping layer bonds to the composite material; and
   f. Cutting the combined gripping layer and composite material to produce a plurality of belt segments.

13. The method of claim 12 wherein the gripping material is selected so that the gripping material has a coefficient of friction above 1.

14. The method of claim 12 wherein the binding material is a thermoset urethane.

15. The method of claim 14 wherein the gripping material is a thermoplastic urethane.

16. The method of claim 12 wherein each belt segment includes an integral fastener, and the belt forming step includes the step of connecting a plurality of belt links in superimposed successive overlapping relation with the integral fasteners connecting adjacent links.

17. The method of claim 12 wherein the gripping material is deposited on the composite material so that the gripping layer is coextensive with the upper surface of the composite material forming the belt segments.

18. A method for producing a belt link used to form a continuous interlocking link belt, comprising the steps of:
   a. Forming a composite material having a plurality of layers of reinforcing material and a binder material;
   b. Depositing a binding material on the reinforcing material to produce a composite material having an upper surface and a lower surface;
   c. Selecting a gripping material having a different composition than the binding material, such that the gripping material has a higher coefficient of friction than the binding material;

d. Depositing the gripping material on the upper surface of the composite material prior to drying the composite material;

e. Curing the gripping layer and composite material so that the gripping layer bonds to the composite material; and f. Cutting the combined gripping layer and composite material to form a belt link having a belt link body and an integral fastening tab, such that the belt link body and fastening tab have a top surface formed by the gripping layer.

19. The method of claim 18 wherein the step of curing comprises curing the gripping layer and the composite material so that the binder material bonds to the reinforcing material such that the layers of reinforcing material are bonded togther substantially solely by the binder material.

* * * * *

UNITED STATES PATENT AND TRADEMARK OFFICE
CERTIFICATE OF CORRECTION

PATENT NO.      : 6,565,689 B2
DATED           : July 3, 2003
INVENTOR(S)     : Geib et al.

It is certified that error appears in the above-identified patent and that said Letters Patent is hereby corrected as shown below:

Column 5,
Line 25, "service" should read -- surface --;

Signed and Sealed this

Twenty-third Day of September, 2003

JAMES E. ROGAN
*Director of the United States Patent and Trademark Office*